United States Patent
Hayakawa et al.

(10) Patent No.: US 6,308,263 B1
(45) Date of Patent: *Oct. 23, 2001

(54) PIPELINE PROCESSING APPARATUS FOR REDUCING DELAYS IN THE PERFORMANCE OF PROCESSING OPERATIONS

(75) Inventors: Hiroshi Hayakawa, Nagoya; Harutsugu Fukumoto, Anjo; Hiroaki Tanaka, Okazaki, all of (JP)

(73) Assignee: Nippondenso Co., Ltd., Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,022

(22) Filed: Oct. 29, 1999

Related U.S. Application Data (62) Division of application No. 08/725,709, filed on Oct. 4, 1996, now Pat. No. 6,003,127.

(30) Foreign Application Priority Data

Oct. 4, 1995 (JP) .................................................. 7-257725
Oct. 6, 1995 (JP) .................................................. 7-260409

(51) Int. Cl.$^7$ ..................................................... G06F 9/42
(52) U.S. Cl. ........................................................... 712/230
(58) Field of Search ................................ 712/200, 208, 712/230, 233, 243, 245

(56) References Cited

U.S. PATENT DOCUMENTS

| | | | |
|---|---|---|---|
| 4,003,033 | * 1/1977 | O'Keefe et al. | 710/107 |
| 4,179,737 | * 12/1979 | Kim | 712/241 |
| 4,760,519 | 7/1988 | Papworth et al. | 712/217 |
| 4,777,587 | 10/1988 | Case et al. | 712/235 |
| 5,088,030 | 2/1992 | Yoshida | 713/200 |
| 5,202,967 | 4/1993 | Matsuzaki | 712/212 |
| 5,317,703 | 5/1994 | Hayakawa et al. | 712/239 |
| 5,333,284 | 7/1994 | Nugent | 712/218 |
| 5,630,085 | * 5/1997 | Watanable | 712/207 |

FOREIGN PATENT DOCUMENTS

| | | |
|---|---|---|
| 63-5433 | 1/1988 | (JP) . |
| 2-254541 | 10/1990 | (JP) . |
| 4-60720 | 2/1992 | (JP) . |
| 4-98426 | 3/1992 | (JP) . |
| 5-2494 | 1/1993 | (JP) . |
| 5-73310 | 3/1993 | (JP) . |
| 5-224926 | 9/1993 | (JP) . |
| 5-257875 | 10/1993 | (JP) . |
| 5-298095 | 11/1993 | (JP) . |
| 6-161751 | 8/1994 | (JP) . |
| 7093150 | 4/1995 | (JP) . |

OTHER PUBLICATIONS

"Quantitative Approach for Computer Architecture Design, Realization, Evaluation (*Nikkei BP)," May 31, 1993.
"RISC System" translated by K. Ohmori, Nov. 1, 1991, p. 75.
"SH7000 Series Programming Manual (1st edition)," Sep., 1993, p. 148.
"H08/300 Series PRogramming Manuarl (3rd edition)," Mar., 1993, p. 69.

* cited by examiner

Primary Examiner—David Y. Eng
(74) Attorney, Agent, or Firm—Pillsbury Winthrop LLP (57) ABSTRACT

A decoder decodes a branch instruction. An operating section executes logical, arithmetic, and shift operations. A register file store operation result of the operating section. A program counter counting the address of the present programs. A direct-setting bus is provided to allowing the decoder to directly set an immediate value to the program counter without passing through an output bus of the operating section. And, a switch selectively connects the direct-setting bus or the output bus to the program counter.

8 Claims, 9 Drawing Sheets

(A) CONDITION ESTABLISHED (B) CONDITION NOT ESTABLISHED

FIG. 11 PRIOR ART

PIPELINE PROCESSING APPARATUS FOR REDUCING DELAYS IN THE PERFORMANCE OF PROCESSING OPERATIONS

This is a division of application Ser. No. 08/725,709, filed Oct. 4, 1996 now U.S. Pat. No. 6,003,127.

BACKGROUND OF THE INVENTION

1. Field of the Invention

This invention relates to a speed-up technique for realizing a quick processing in response to a branch instruction or in an exceptional treatment or handling based on an internal vector.

2. Related Art

In general, instruction address operations in a micro processor are classified into two categories, i.e. fixed command operations in accordance with ordinary instructions and non-fixed command operations in accordance with branch instructions or the like.

In the case of ordinary instructions, their instruction addresses are calculated during an IF (instruction fetch) stage. On the other hand, in the case of branch instructions, their instruction addresses are calculated during an EX (execution of operation) stage. Branch instructions generally comprise the addressing mode such as a program counter relative branch, an immediate branch, and a register direct branch. Among them, the program counter relative branch is an instruction to execute the operation of the program counter and a relative value at the EX stage. On the other hand, the immediate branch and the register direct branch are instructions both dealing with their branch addresses as immediate values, and hence they execute the processing for setting immediate value to the program counter in the EX stage (Refer to "H8/327, SH7032 Programming Manuals of Hitachi, or RISC System by K. Ohmori, Kaibundo publishing Co., Ltd.).

As one of this kind of conventional technologies, a micro processor adopting a 5-stage pipeline processing system will be explained hereinafter.

Figure 5:
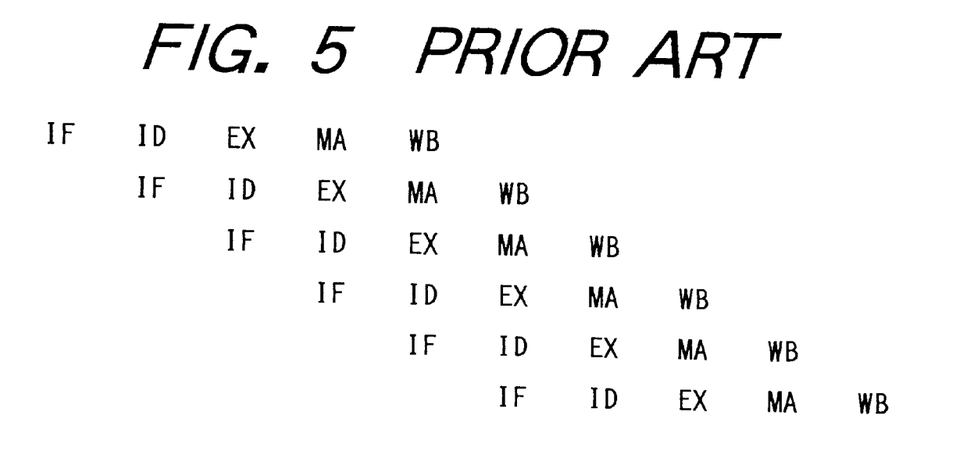
FIG. 5 is a view showing the operation of a pipeline processing system in a conventional micro processor.

Sequential five stages of this pipeline processing consists of IF (instruction fetch), ID (instruction decode), EX (execution of operation), MA (memory access) and WB (write back) stages. FIG. 5 shows the sequential flow representing the ordinary 5-stage pipeline processing.

Figure 6:
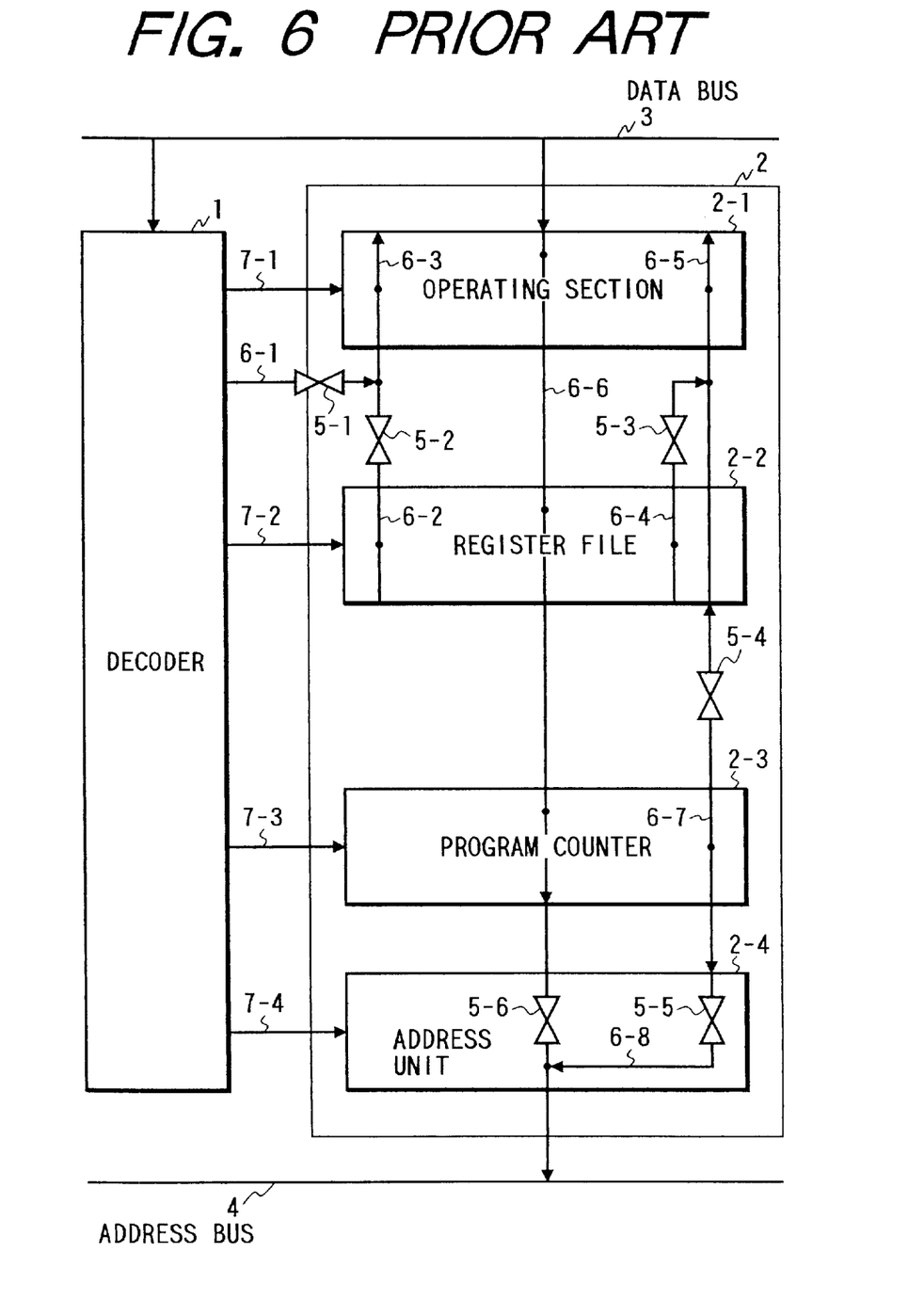
FIG. 6 is a schematic block diagram showing the overall arrangement of the conventional micro processor.

FIG. 6 shows the arrangement of a conventional micro processor which comprises a decoder 1 and a data path 2. Data path 2 comprises an operating section 2-1 performing logical operations, arithmetic operations, shift operations and so on, a register file 2-2 storing the operation or computation data, a program counter 2-3 counting the address of the present program, and an address unit 2-4 selectively switching the output to an address bus 4 from operating section 2-1 or program counter 2-3. Operating section 2-1 through address unit 2-4 are respectively controlled in response to the signals of control buses 7-1 through 7-4 fed from decoder 1.

Micro processor designates an address in a memory (not shown) by outputting data through address bus 4 and reads out the instruction stored in the designated address through data bus 3, and then decodes the readout instruction in decoder 1, thereby controlling the data path 2.

An immediate bus 6-1 is provided between decoder 1 and operating section 2-1. Read buses 6-2 and 6-4 are provided to read out the data from register file 2-2. Reference numerals 6-3 and 6-5 represent input buses of operating section 2-1, while 6-6 represents an output bus of operating section 2-1. Furthermore, reference numeral 6-7 represents a read bus of program counter 2-3, and 6-8 represents an input bus of address unit 2-4. There are also provided a plurality of bidirectional switches 5-1 through 5-6 to switch the above-described buses 6-1, 6-2, 6-4, 6-5, 6-6 and 6-7.

Regarding operation timing, each stage of IF through WB has the following relationship or correspondence to each of units 2-1 through 2-4 constituting the data path 2.

Program counter 2-3 operates during the IF stage. Decoder 1 (control section) and register file 2-2 operate during the ID stage. Operating section 2-1 operates during the EX stage. Address unit 2-4 operates during the MA stage. And, register file 2-2 operates during the WB stage.

Figure 7:
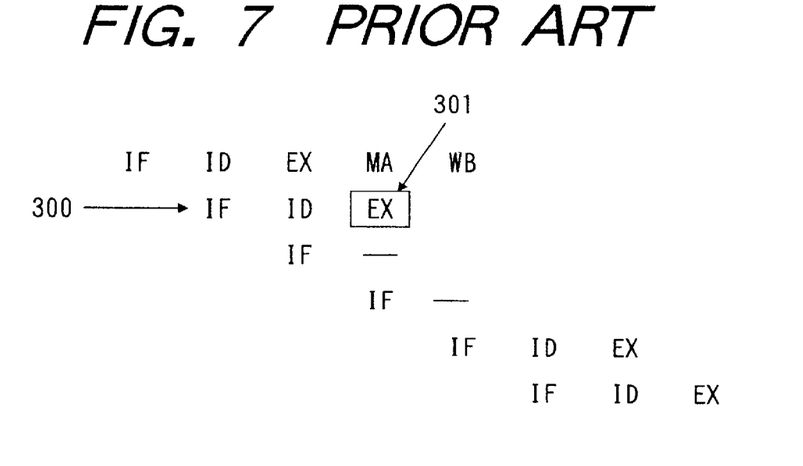
FIG. 7 is a view showing the operation of a pipeline processing system in the conventional micro processor.

The immediate branch instruction in the above-described conventional micro processor is executed according to the pipeline flow shown in FIG. 7. More specifically, the branch address decoded in decoder 1 is entered from immediate bus 6-1 to operating section 2-1 in EX stage 301 and then is set through output bus 6-6 to program counter 2-3.

Similarly, in executing the register direct branch instruction in the above-described micro processor, the branch address is read out from register file 2-2 and is entered through buses 6-4 and 6-5 to operating section 2-1, and is then set via bus 6-6 to program counter 2-3.

In this manner, according to the above-described conventional micro processor, the branch address is always set to the program counter 2-3 via operating section 2-1 in the response to the branch instruction or in the exceptional treatment. Hence, when seen on the processing stage flow, the above-described micro processor is forced to pass through the EX stage every time, resulting in a significant delay in the processing speed.

Figure 11:
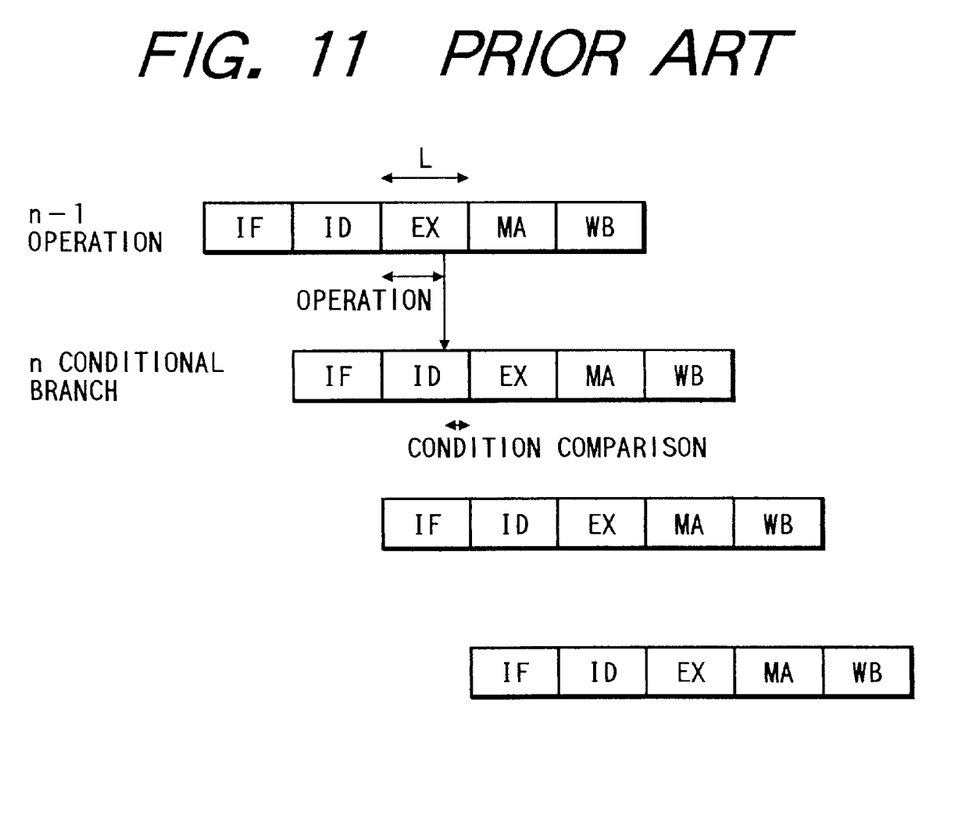
FIG. 11 is a view showing the operation of a pipeline processing system in the conventional micro processor.

Furthermore, FIG. 11 shows the relationship between the instruction processing cycle and each stage in a micro processor adopting the 5-stage pipeline processing system.

In this example, it is now assumed that a conditional branch instruction is fetched inn instruction processing cycle. This conditional branch instruction is decoded in the ID stage. There is a waiting time for waiting the operation result coming from the EX stage of the immediately preceding n−1 instruction processing cycle. Then, at the timing of ID stage of the own n instruction processing cycle, the operation result obtained from the n−1 instruction processing cycle is compared with the branch condition. Thereafter, the processing flow proceeds to the EX stage of the branch address.

For this reason, the ID stage of the n instruction processing cycle requires a relatively long time L equivalent to the sum of a first duration required for waiting the operation result obtained from the n−1 instruction processing cycle and a second duration required for comparing the operation result thus obtained and the condition of the branch instruction. In other words, according to the above-described conventional pipeline processing, the length of a particular stage, if it has the longest time, will make other stages delay in their processing time.

SUMMARY OF THE INVENTION

Accordingly, in view of above-described problems encountered in the related art, a principal object of the present invention is to realize a quick processing in response to a branch instruction and in the exceptional treatment.

Furthermore, another object of the present invention is to effectively execute the comparison processing in response to a given conditional branch so as to shorten the processing time.

In order to accomplish this and other related objects, according to a first aspect of the present invention, a micro processor comprises: a decoder for decoding a branch instruction; an operating section for executing logical, arithmetic, and shift operations; a program counter for counting the address of the present program; a direct-setting bus for allowing the decoder to directly set an immediate value to the program counter without passing through an output bus of the operating section; and a switch for selectively connecting the direct-setting bus or the output bus to the program counter.

According to a second aspect of the present invention, a micro processor comprises: an operating section for executing logical, arithmetic, and shift operations; a register file for storing operation result of the operating section; a program counter for counting the address of the present program; a direct-setting bus for allowing the register file to directly set a register value to the program counter without passing through an output bus of the operating section; and a switch for selectively connecting the direct-setting bus or the output bus to the program counter.

Furthermore, a third aspect of the present invention provides a pipeline processing apparatus for dividing each instruction processing cycle into a plurality of sequential stages, and executing the processing of respective stages in parallel at timings overlapped partly. This pipeline processing apparatus comprises: a means for fetching a branch instruction; and a means for executing a comparison of branch condition relating to the branch instruction at a timing for executing an operating stage of an instruction processing cycle which fetched the branch instruction, the operating stage of the instruction processing cycle being provided to calculate a branch address.

According to the features of preferred embodiments, it is desirable that the instruction processing cycle which fetched the branch instruction calculates the branch address without waiting comparison result of branch condition, so that the calculation of the branch address and the comparison of the branch condition can be executed in a concurrent manner.

Furthermore, a fourth aspect of the present invention provides a decoding apparatus comprising a group of registers and a group of decoders, for controlling each unit in a data path so as to control a plurality of sequential stages of a pipeline processing, wherein a comparator for judging branch condition relating to a branch instruction is disposed in parallel to a register dedicated to an operating stage of the pipeline processing.

According to the features of the preferred embodiments, it is preferable that the registers comprise a condition register for memorizing decoding result of the branch instruction at a decode stage and a flag register for memorizing an operation result flag at the operation stage through the data path, and the data memorized in the condition register and the flag register are entered into the comparator.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Preferred embodiments of the present invention will be explained in greater detail hereinafter with reference to the accompanying drawings. Identical parts are denoted by the same reference numerals throughout the views.

Figure 1:
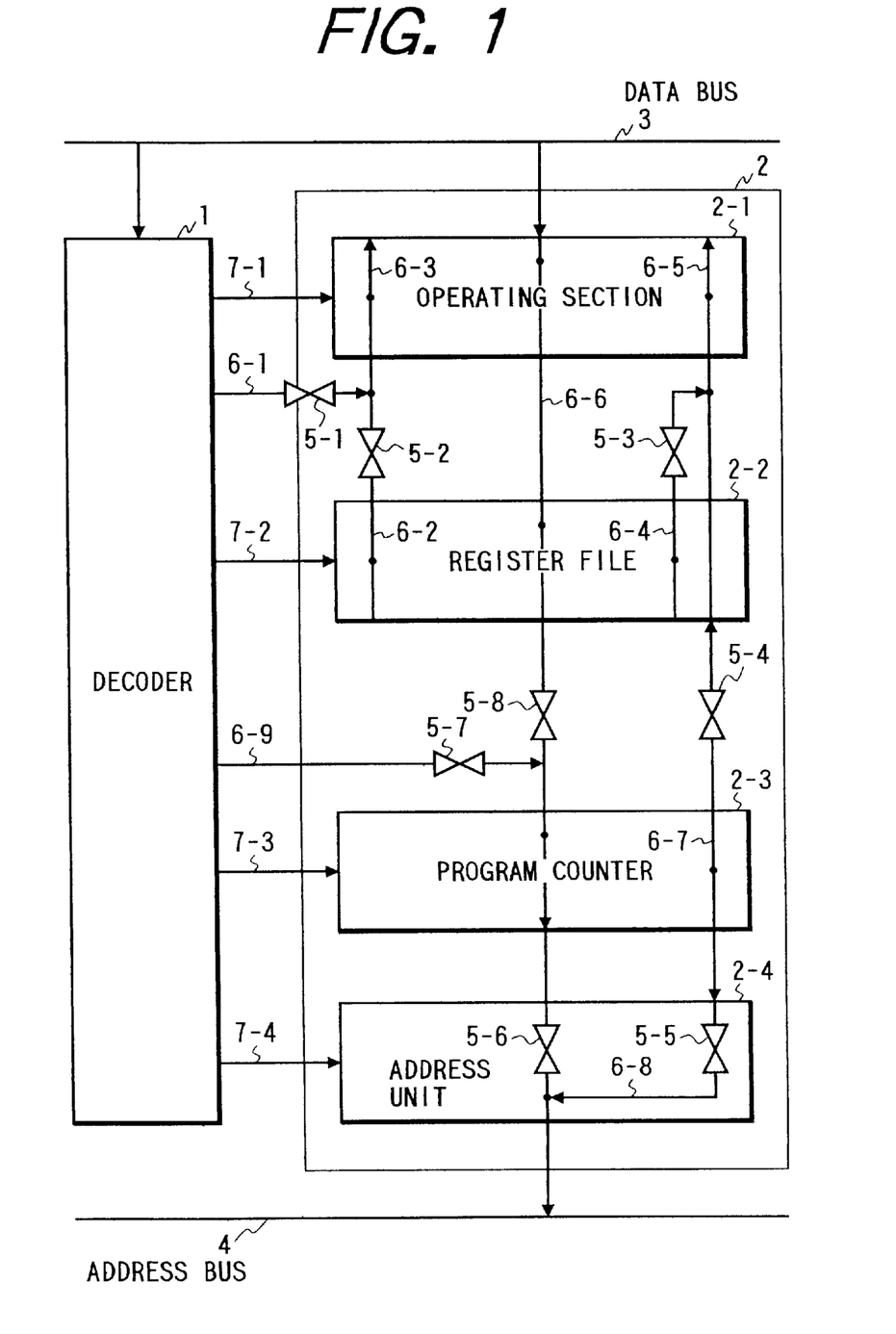
FIG. 1 is a schematic block diagram showing the overall arrangement of a micro processor in accordance with a first embodiment of the present invention.

FIG. 1 is a block diagram showing a micro processor in accordance with a first embodiment of the present invention. This micro processor realizes the speed-up of the processing in response to the immediate branch instruction.

The micro processor of the first embodiment, as understood. from the comparison between FIGS. 1 and 6, comprises an immediate bus 6-9 associated with a bidirectional switch 5-7 and a bidirectional switch 5-8 provided in the output bus 6-6 in addition to the components provided in the conventional micro processor shown in FIG. 6. Immediate bus 6-9 with bidirectional switch 5-7 has a function of allowing decoder 1 to directly set an immediate value to program counter 2-3.

Figure 2:
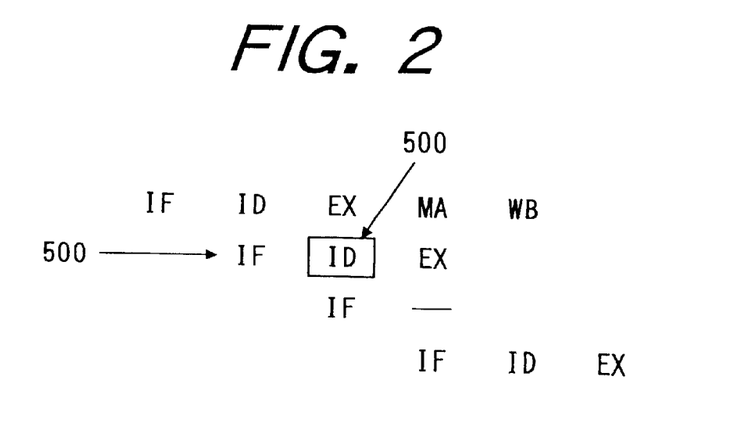
FIG. 2 is a view showing the operation of a pipeline processing system in response to an immediate branch instruction in accordance with the first embodiment of the present invention.

FIG. 2 shows the pipeline flow of the immediate branch processing in this micro processor. More specifically, an. immediate branch instruction is fetched at IF stage 500, then this instruction is decoded by decoder 1 at ID stage 501 and at the same time this instruction is directly set through immediate bus 6-9 to program counter 2-3. Accordingly, there is no necessity of executing the next EX stage. In other words, the processing can be started from the n+2 processing cycle by directly fetching the instruction from the branch address. In this case, switch 5-7 is opened and switch 5-8 is closed, thereby switching the input bus of data to program counter 2-3.

In this manner, according to the first embodiment, the immediate branch processing can be quickly performed.

Figure 3:
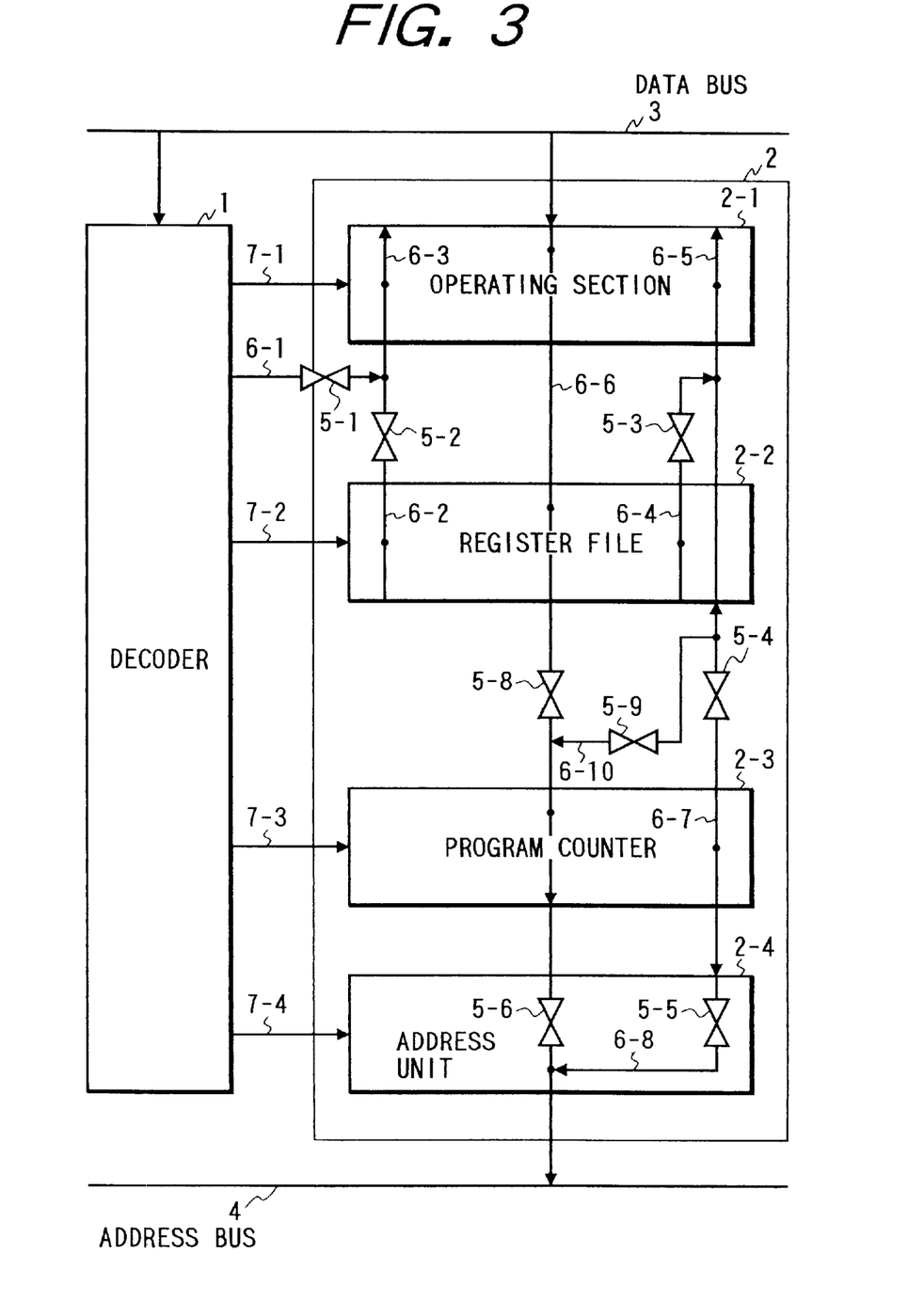
FIG. 3 is a schematic block diagram showing the overall arrangement of a micro processor in accordance with a second embodiment of the present invention.

FIG. 3 is a block diagram showing a micro processor in accordance with a second embodiment of the present invention. This micro processor realizes the speed-up of the processing in response to the register direct branch instruction.

The micro processor of the second embodiment, as understood from the comparison between FIGS. 3 and 6, comprises bidirectional switch 5-8 provided in the output bus 6-6 of operating section 2-1 in the same manner as the first embodiment in addition to the components of the conventional micro processor shown in FIG. 6. Furthermore, the micro processor of the second embodiment comprises a bus 6-10 connecting an intermediate point between bidirectional switch 5-4 and operating section 2-1 and an intermediate point between bidirectional switch 5-8 and program counter 2-3. Bus 6-10, associated with a bidirectional switch 5-9, has a function of allowing the direct setting to program counter 2-3.

When the register direct branch processing is performed, bidirectional switches 5-3 and 5-9 are opened while bidirectional switch 5-8 is closed. With this switching operation, the data (register value) in the register file 2-2 is directly set to program counter 2-3 via a direct-setting bus 6-10. Accordingly, in the same manner as in the first embodiment, passing through operating section 2-1 is no longer required to complete the setting of the branch address at the stage preceding the EX stage. Thus, the branch processing can be immediately started.

In this manner, according to the second embodiment, the register direct branch processing can be quickly performed.

Figure 4:
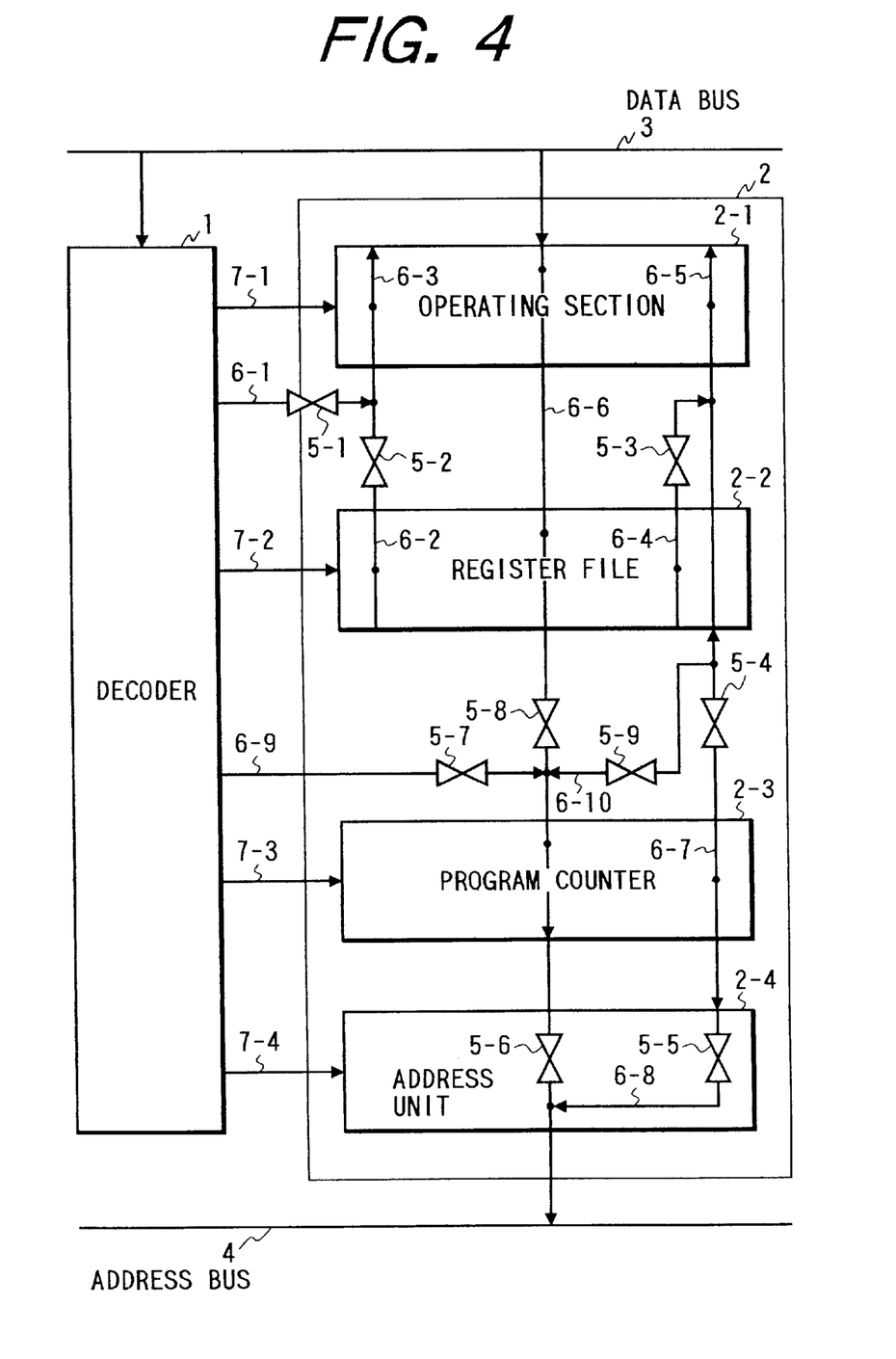
FIG. 4 is a schematic block diagram showing the overall arrangement of a micro processor in accordance with a third embodiment of the present invention.

FIG. 4 is a block diagram showing a micro processor in accordance with a third embodiment of the present invention which is substantially the combination of the above-described first embodiment and the second embodiment.

According to this third embodiment, it becomes possible to realize the speed-up the operation of the micro processor in both the immediate branch processing and the register direct branch processing.

A fourth embodiment of the present invention will be explained with reference to FIGS. 8 through 10.

Figure 8:
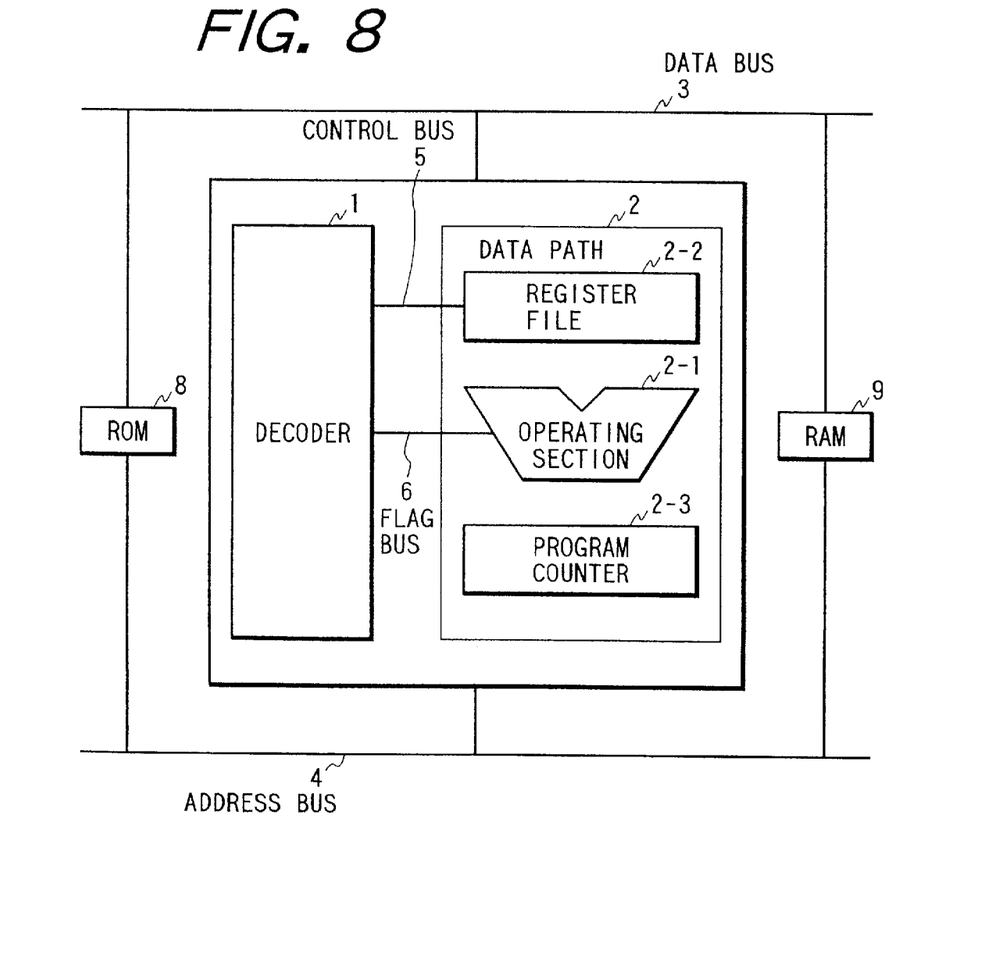
FIG. 8 is a schematic block diagram showing the overall arrangement of a micro processor in accordance with a fourth embodiment of the present invention.

FIG. 8 shows the arrangement of the micro processor in accordance with the fourth embodiment. The micro processor of the fourth embodiment comprises decoder 1 which reads out an intended instruction from a memory (ROM 8 or RAM 9) via data bus 3 in accordance with the data of address bus 4 and decodes the readout instruction, and data path 2 controlled by decoder 1 via a control bus 5.

Data path 2 comprises operating section 2-1 performing logical operations, arithmetic operations, shift operations and so on, register file 2-2 storing the computation data, and program counter 2-3 counting the address of the present program. The flag of operation result is supplied to decoder 1 via a flag bus 6.

Figure 9:
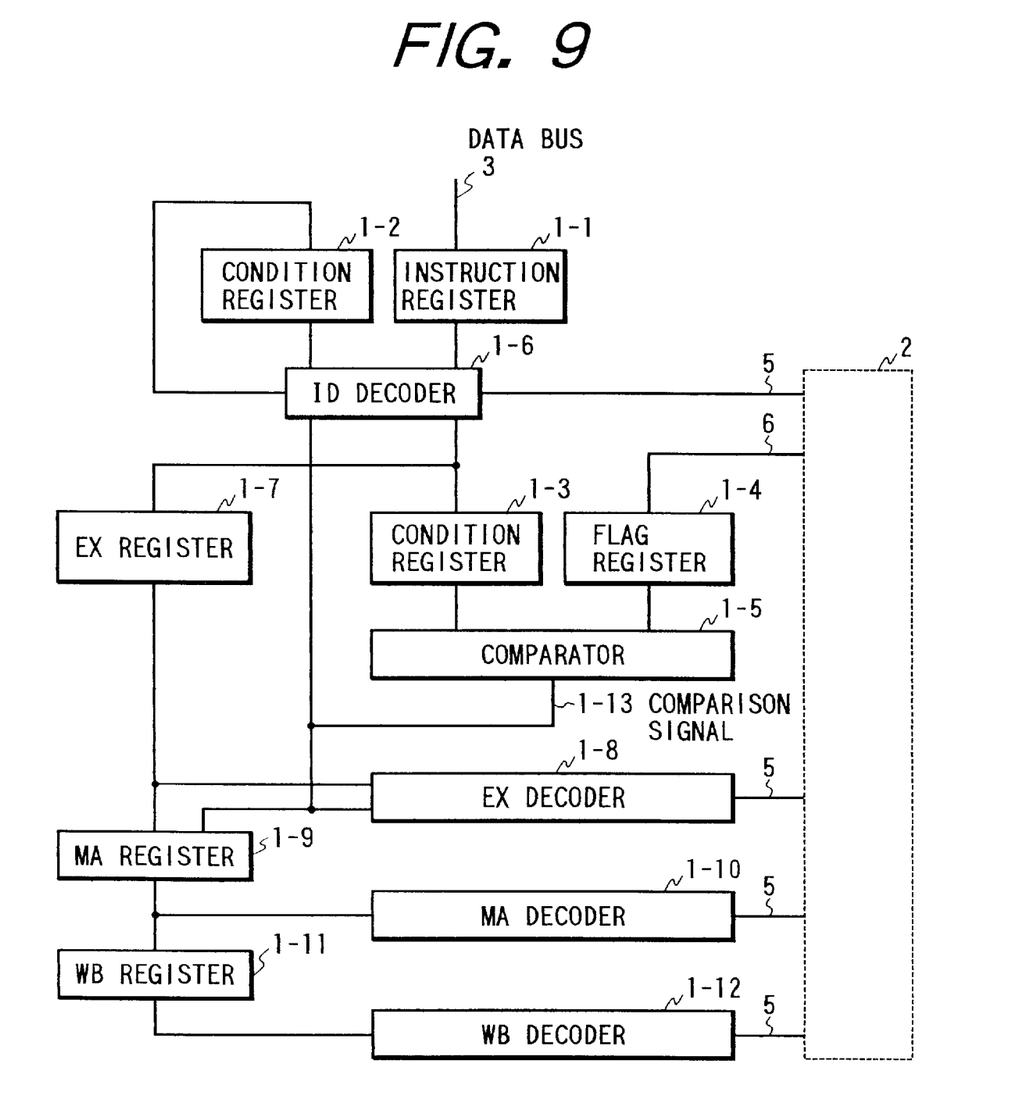
FIG. 9 is a block diagram showing the detailed arrangement of a decoder unit incorporated in the micro processor in accordance with the fourth embodiment of the present invention.

FIG. 9 shows the detailed arrangement of decoder 1. An instruction register 1-1 stores the instruction sent through data bus 3. A condition register 1-2 varies in response to the value of instruction register 1-1, the present control condition and the comparison signal 1-13. A condition register 1-3 memorizes the condition of the conditional branch instruction. A flag register 1-4 memorizes the operation result flag entered from data path 2 through flag bus 6. A comparator 1-5 compares the memorized data between condition register 1-3 and flag register 1-4, and then generates a comparison signal 1-13 based on the comparison result. EX register 1-7, MA register 1-9 and WB register 1-11 store the control information relating to the EX stage, MA stage and WB stage, respectively. ID decoder 1-6, EX decoder 1-8, MA decoder 1-10 and WB decoder 1-12 decode the control information of respective stages and send out the control signals to corresponding units of data path 2 via control bus 5. Each of the above-described registers operates in synchronism with a system clock (not shown).

The characteristic arrangement of decoder 1 in accordance with this fourth embodiment resides in the provision of comparator 1-5. Comparator 1-5 is disposed in parallel with EX register 1-7. Accordingly, the forth embodiment of the present invention makes it possible to execute the above-described comparison in this comparator 1-5 independently of the control and execution of the EX stage by EX register 1-7 and EX decoder 1-8.

Figure 10:
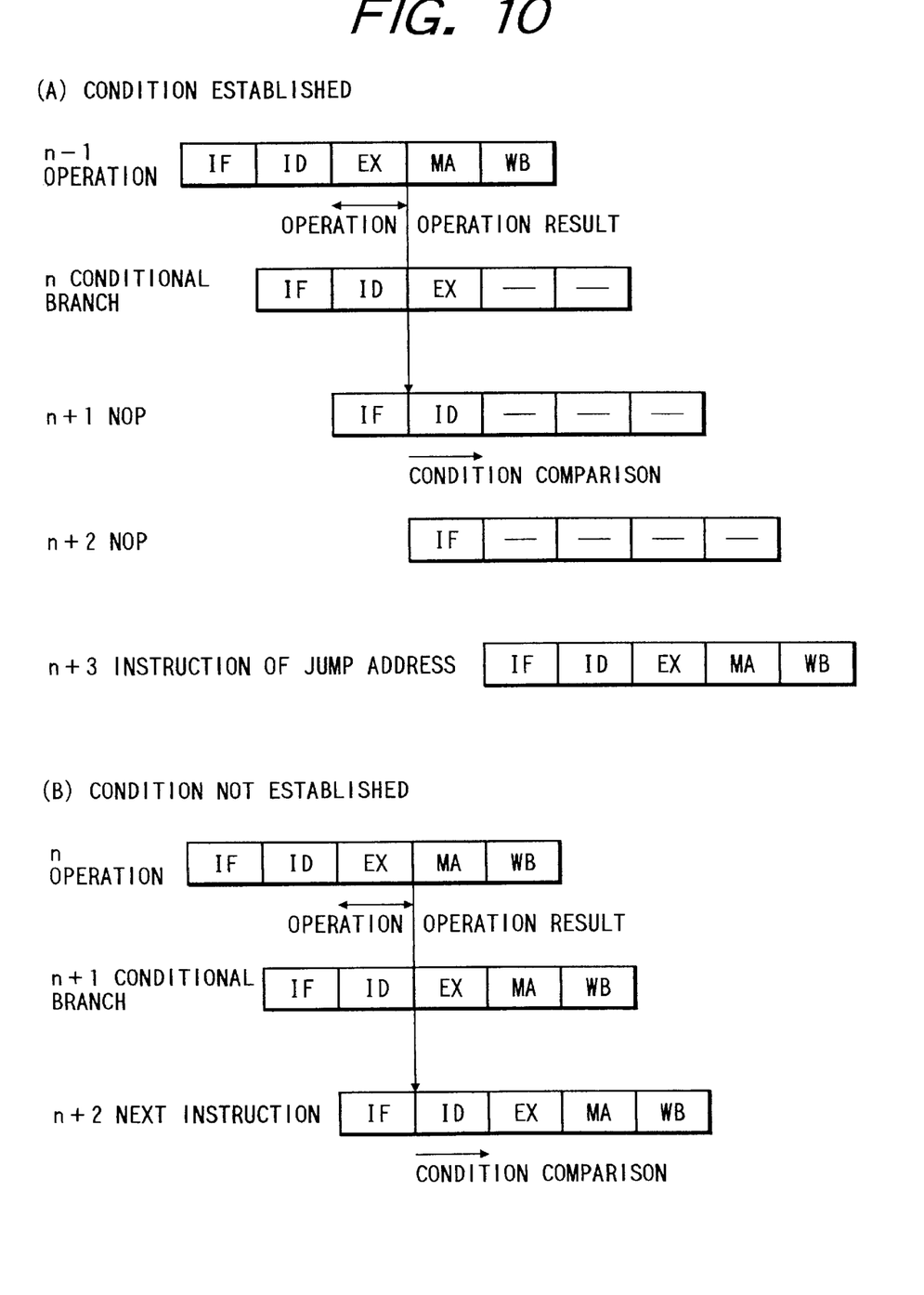
FIG. 10 is a view showing the operation of a pipeline processing system in accordance with the forth embodiment of the present invention.

FIG. 10 shows the pipeline processing flow in the micro processor comprising the decoder shown in FIG. 9.

According to this micro processor, each instruction processing cycle is dissected or divided into sequential five stages of IF (instruction fetch), ID (instruction decode), EX (execution of operation), MA (memory access) and WB (write back). Respective instruction processing cycles are processed in parallel or in a concurrent manner. In other words, a plurality of instruction processing cycles are executed at timings overlapped partly, so as to realize a 5-stage pipeline processing system.

As shown in (A) of FIG. 10, when a conditional branch instruction is fetched at n instruction processing cycle, the ID stage of this instruction processing cycle performs only the decoding of instruction, without performing the comparison between the operation result of n−1 cycle and the branch condition, and then the processing flow directly proceeds to the EX stage to calculate the branch address.

The branch condition of the conditional branch instruction is sent from ID decoder 1-6 to condition register 1-3 and is stored there. The operation result flag of the n−1 instruction processing cycle is sent from data path 2 through flag bus 6 to flag register 1-4 and is stored there. Then, the branch condition stored in condition register 1-3 and the operation result flag stored in flag register 1-4 are both entered into comparator 1-5. Comparator 1-5 generates a comparison signal representing the result on whether the branch condition is established or not established. This comparison is executed at the time when EX register 1-7 and EX decoder 1-8 cooperatively cause the units of data path 2 to execute the processing for the branch address.

Accordingly, it is regarded that, in the flow (A) of FIG. 10, the comparison for checking the establishment/non-establishment of the branch condition is executed at the ID) stage of the n+1 instruction processing cycle.

When the branch condition is established as a result of the above-described comparison, execution of the EX stage in the n+1 processing cycle is abandoned in response to the output of comparator 1-5 sent to EX decoder 1-8. Similarly, executions of the MA stage and the WB stage are abandoned in response to the output of comparator 1-5 sent to MA register 1-9 and WB register 1-11, respectively.

Then, the next n+2 instruction is changed to the NOP instruction when the value stored in condition register 1-2 is varied in response to comparison signal 1-13. Subsequently, in n+3 instruction processing cycle, the branch address calculated at the EX stage of the n instruction processing cycle is sent out to address bus 4 to jump to the designated address, thereby changing the program.

Executions of the MA stage and the WB stage in the n instruction processing cycle are abandoned in response to comparison signal 1-13, too.

On the other hand, when the branch condition is not established, the next n+1 instruction is executed without any jump, as shown in (B) of FIG. 10.

As explained above, the length of the ID stage in the instruction processing cycle which fetched the conditional branch instruction is influenced only by the operation time not by the sum of the operation time and the comparison time. Hence, it becomes possible to shorten the entire processing time.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A micro processor comprising:

a decoder for decoding a branch instruction;

an operating section for executing logical, arithmetic, and shift operations;

a program counter for counting the address of a present program;

a direct-setting bus for allowing said decoder to directly set an immediate value to said program counter by skipping an output bus of said operating section, said direct-setting bus being other than a control bus for a control signal; and a selector for selectively connecting said direct-setting bus to said program counter in response to said branch instruction, thereby substantially reducing overall processing time responsive to said branch instruction.

2. A micro processor comprising:

an operating section for executing logical, arithmetic, and shift operations;

a register file for storing operation result of said operating section;

a program counter for counting the address of a present program;

a direct-setting bus for allowing said register file to directly set a register value to said program counter by skipping an output bus of said operating section, said register value directly set to said program counter being a branch address, said direct-setting bus being other than a control bus for a control signal; and a selector for selectively connecting said direct-setting bus to said program counter in response to a branch instruction, thereby substantially reducing overall processing time responsive to said branch instruction.

3. A micro processor performing pipeline processing consisting of sequential stages of ID (instruction decode), EX (execution of operation), MA (memory access), and WB (write back) in response to fetch of an instruction, said micro processor comprising:

a decoder for decoding the instruction and controlling an operating section which executes logical, arithmetic and shift operations, a register file which stores operation or computation data of said operating section, and a program counter which counts the address of a program;

an input bus for sending data from said decoder to said operating section;

an output bus for sending the operation or computation data of said operating section to said program counter;

a switch for opening or closing said output bus;

a direct-setting bus for directly setting an immediate value to said program counter from said decoder; and a switch for opening or closing said direct-setting bus;

wherein, when a fetched instruction is a branch instruction other than an immediate branch instruction, a branch address decoded by said decoder is first sent via said input bus to said operating section for arithmetic processing and is subsequently set via said output bus to said program counter and, when said fetched instruction is an immediate branch instruction, a branch address decoded by said decoder is directly set from said decoder via said direct-setting bus to said program counter so as to skip said operating section by controlling open-and-close conditions of said switches.

4. The micro processor in accordance with claim 3, wherein the setting of said branch address of said immediate branch instruction is performed in said ID stage prior to execution of said EX stage.

5. The micro processor in accordance with claim 3, wherein the branch instruction other than said immediate branch instruction is a program counter relative branch.

6. A micro processor performing pipeline processing consisting of sequential stages of ID (instruction decode), EX (execution of operation), MA (memory access), and WB (write back) in response to fetch of an instruction, said micro processor comprising:

a decoder for decoding the instruction and controlling an operating section which executes logical, arithmetic and shift operations, a register file which stores operation or computation data of said operating section, and a program counter which counts the address of a program;

an input bus for sending data from said register file to said operating section;

an output bus for sending the operation or computation data of said operating section to said program counter;

a switch for opening or closing said output bus;

a direct-setting bus for directly setting a register value to said program counter from said register file; and a switch for opening or closing said direct-setting bus;

wherein, when a fetched instruction is a branch instruction other than a register direct branch instruction, a branch address read out from said register file is first sent via said input bus to said operating section for arithmetic processing and is subsequently set via said output bus to said program counter and, when said fetched instruction is a register direct branch instruction, a branch address read out from said register file is directly set from said register file via said direct-setting bus to said program counter so as to skip said operating section by controlling open-and-close conditions of said switches.

7. The micro processor in accordance with claim 6, wherein the setting of said branch address of said register direct branch instruction is performed in said ID stage prior to execution of said EX stage.

8. The micro processor in accordance with claim 6, wherein the branch instruction other than said register direct branch instruction is a program counter relative branch.

* * * * *